United States Patent
Shibasaki

Patent Number: 5,963,545
Date of Patent: Oct. 5, 1999

[54] FAULT EVALUATING SYSTEM FOR TRANSMISSION APPARATUS

[75] Inventor: Yasuaki Shibasaki, Tokyo, Japan

[73] Assignee: NEC Corporation, Tokyo, Japan

[21] Appl. No.: 08/755,552

[22] Filed: Nov. 22, 1996

[30] Foreign Application Priority Data

Dec. 4, 1995 [JP] Japan ................................ 7-315066

[51] Int. Cl.$^6$ ................................ G01R 31/08
[52] U.S. Cl. ................ 370/242; 370/244; 370/247
[58] Field of Search ................................ 370/242, 244, 370/247, 248, 249, 221, 224; 371/20.1, 20.2, 20.5, 20.6; 375/224, 358; 340/825.16

[56] References Cited

U.S. PATENT DOCUMENTS

| | | | |
|---|---|---|---|
| 3,686,441 | 8/1972 | Thomas | 179/15 |
| 5,408,462 | 4/1995 | Opoczynski | 370/16 |
| 5,461,607 | 10/1995 | Miyagi et al. | 370/16 |

Primary Examiner—Michael Horabik
Assistant Examiner—Binyam Tadesse
Attorney, Agent, or Firm—Sughrue, Mion, Zinn, Macpeak & Seas, PLLC

[57] ABSTRACT

In a fault evaluating system for a transmission apparatus having four packages which are mutually duplexed in both transmission and reception directions and bridged to oppose each other, each package includes a fault detection unit, a fault information extraction unit, a fault information insertion unit, and a fault evaluating unit. The fault detection unit individually detects an abnormality in signals transmitted from duplexed opposing packages. The fault information extraction unit individually extracts fault information representing a fault package, which is contained in the signals transmitted from the duplexed opposing packages. The fault information insertion unit generates fault information representing the fault package in accordance with a detection output from the fault detection unit, inserts the generated fault information and the fault information extracted by the fault information extraction unit in a signal to be transmitted, and sends back the signal to the duplexed opposing packages. The fault evaluating unit specifies the fault package on the basis of the detection output from the fault detection unit and the fault information from the fault information extraction unit.

6 Claims, 3 Drawing Sheets

1

FAULT EVALUATING SYSTEM FOR TRANSMISSION APPARATUS

BACKGROUND OF THE INVENTION

The present invention relates to a fault evaluating system and, more particularly, to a fault evaluating system for four switching packages which are mutually duplexed in both the transmission and reception directions and bridge-connected to oppose each other.

In a transmission apparatus, a conventional fault evaluating system for four packages A, B, C, and D which are duplexed in both the transmission and reception directions such that the duplexed opposing packages are connected to intersect each other has an arrangement in which fault detection units A-3, B-3, C-3, and D-3 are connected to the monitor points of the switching packages A, B, C, and D, respectively, as shown in FIG. 3. The monitor results are collected to a package E which mainly performs alarm processing. A fault package is specified by the firmware in an alarm processing unit E-1 on the basis of the monitor results at the respective monitor points.

In the above-described conventional fault evaluating system, fault information from the respective monitor points of the switching packages A, B, C, and D are temporarily collected to the package E for performing alarm processing. Thereafter, a fault package is evaluated on the basis of the fault evaluating logic of the firmware in the package E. This increases the burden of the firmware. Additionally, since the firmware is interposed, the fault evaluating operation depends upon the operation period of the firmware. As a result, a long time is required from fault detection by hardware to fault evaluation. Therefore, when a fault is detected, relief processing for a main signal, which is performed by redundant system switching by selection units A-5, B-5, C-5, and D-5 on the basis of control of the alarm processing unit E-1, is undesirably delayed.

SUMMARY OF THE INVENTION

It is an object of the present invention to provide a fault evaluating system which omits a package dedicated to fault evaluation.

It is another object of the present invention to provide a fault evaluating system capable of quickly performing fault evaluation of switching packages.

In order to achieve the above objects, according to the present invention, there is provided a fault evaluating system for a transmission apparatus having four packages which are mutually duplexed in both transmission and reception directions and bridged to oppose each other, wherein each of the packages comprises fault detection means for individually detecting an abnormality in signals transmitted from duplexed opposing packages, fault information extraction means for individually extracting fault information representing a fault package, which is contained in the signals transmitted from the duplexed opposing packages, fault information insertion means for generating fault information representing the fault package in accordance with a detection output from the fault detection means, inserting the generated fault information and the fault information extracted by the fault information extraction means in a signal to be transmitted, and sending back the signal to the duplexed opposing packages, and fault evaluating means for specifying the fault package on the basis of the detection output from the fault detection means and the fault information from the fault information extraction means.

DESCRIPTION OF THE PREFERRED EMBODIMENT

An embodiment of the present invention will be described below with reference to the accompanying drawings.

Figure 1:
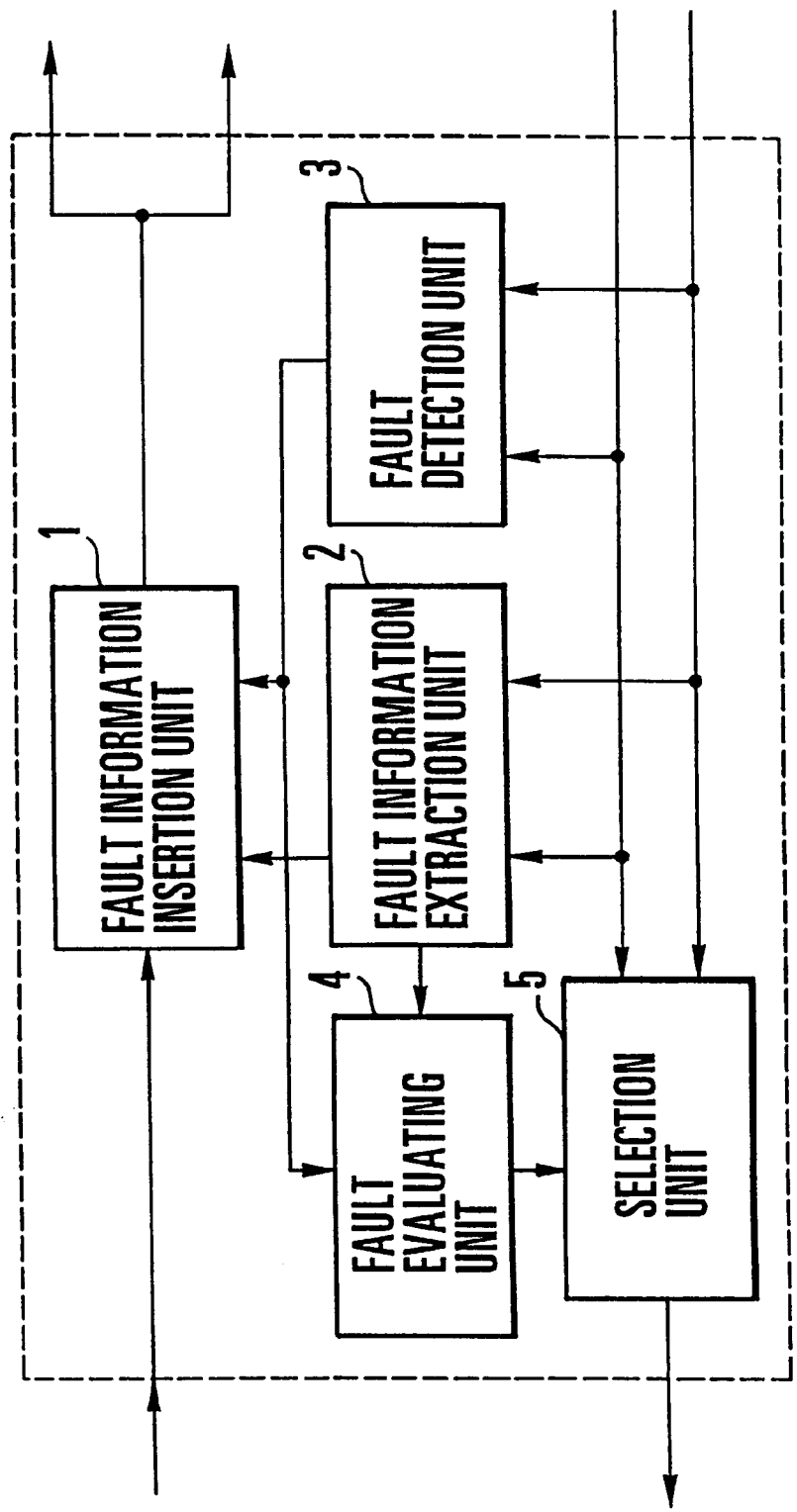
FIG. 1 is a block diagram showing an example of a switching package used in the present invention.

FIG. 1 shows an example of a switching package used in a fault evaluating system of the present invention. The switching package shown in FIG. 1 constitutes a transmission/reception package. The main signal transmission system has a fault information insertion unit 1 which inserts fault information in a free time slot of the main signal and commonly transmits the main signal to two partner switching packages. On the other hand, the main signal reception system has a fault information extraction unit 2 for extracting fault information inserted in main signals from the two partner switching packages, a fault detection unit 3 for detecting a fault by monitoring the states of the signals from the two partner switching packages, a fault evaluating unit 4 for performing fault evaluation on the basis of the fault information of the switching package, which is extracted from the main signal by the fault information extraction unit 2, and a selection unit 5 for selecting one of the partner switching packages in accordance with the fault evaluating result from the fault evaluating unit 4.

Figure 2:
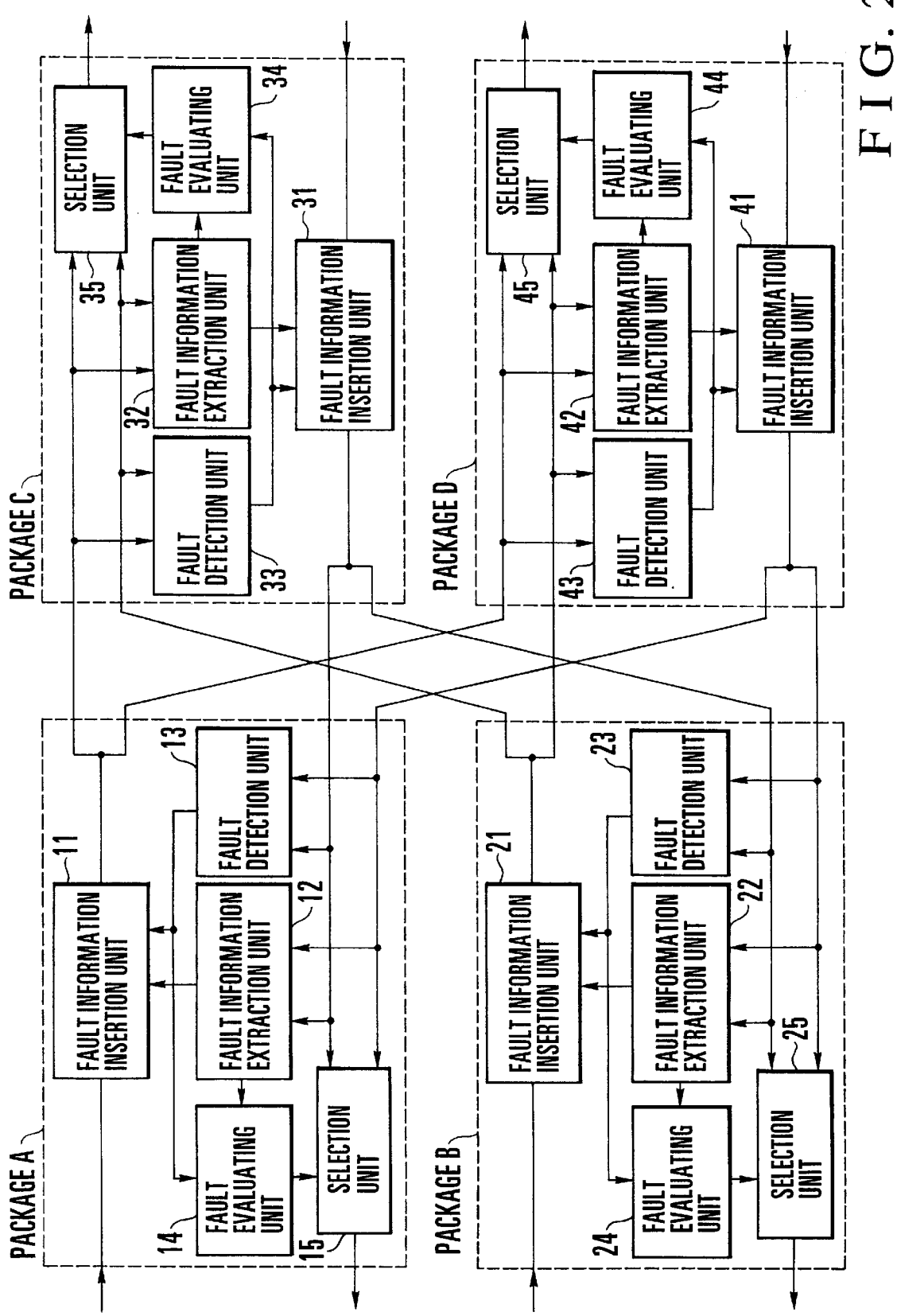
FIG. 2 is a block diagram schematically showing a fault evaluating system according to an embodiment of the present invention using the switching package shown in FIG. 1.
Figure 3:
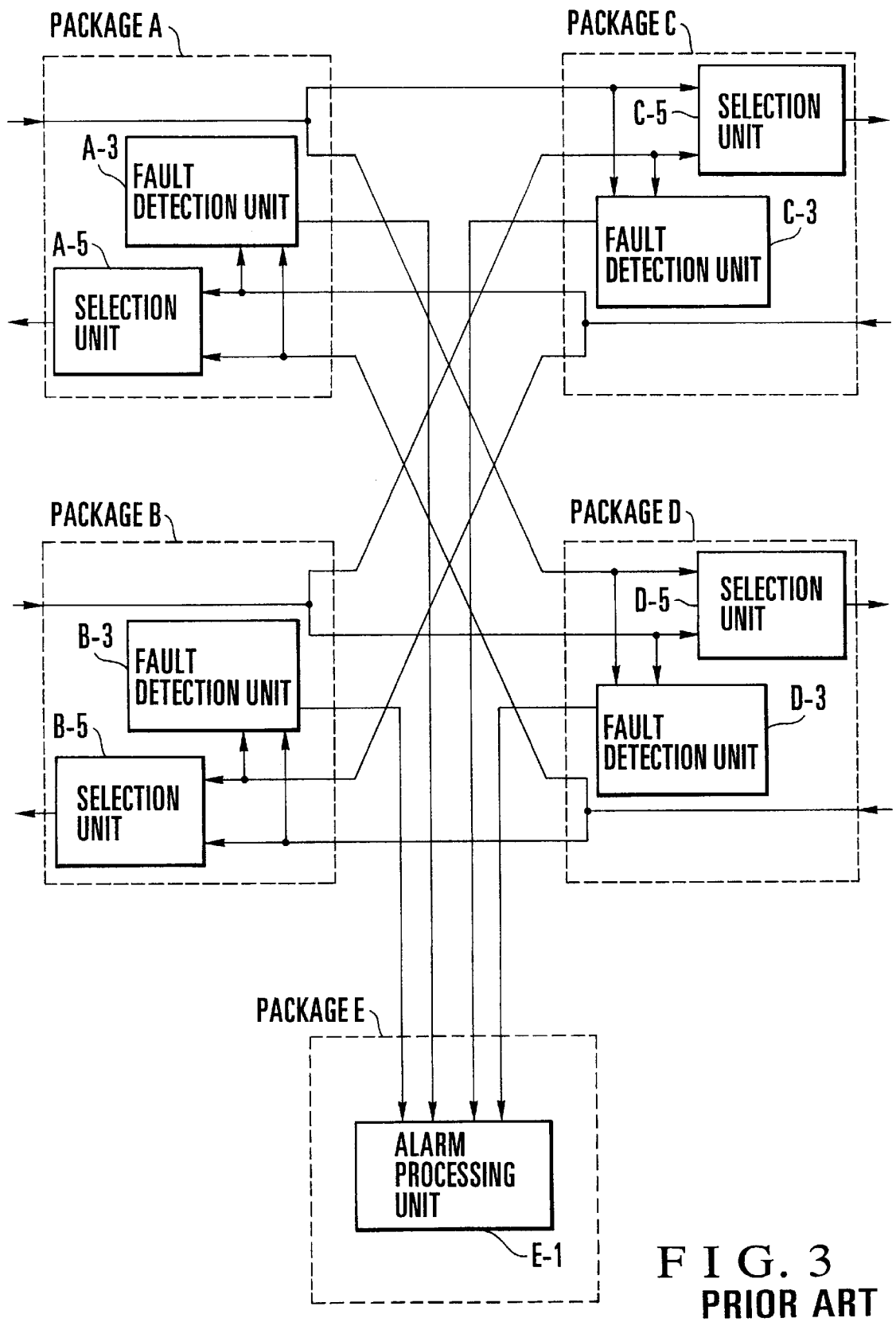
FIG. 3 is a block diagram schematically showing a conventional fault evaluating system.

FIG. 2 shows a fault evaluating system according to an embodiment of the present invention using the switching package shown in FIG. 1. In this embodiment, switching packages A and B and switching packages C and D, which are arranged to oppose each other and perform time-divisional transmission using a plurality of time slots, are duplexed in both the transmission and reception directions and bridged to each other, thereby constituting transmission/reception packages. More specifically, the transmission system of the switching package A is connected to the reception systems of the switching packages C and D, and the transmission system of the switching package B is connected to the reception systems of the switching packages C and D. In addition, the transmission system of the switching package C is connected to the reception systems of the switching packages A and B, and the transmission system of the switching package D is connected to the reception systems of the switching packages A and B. The switching packages A, B, C, and D respectively comprise fault information insertion units 11, 21, 31, and 41, fault information extraction units 12, 22, 32, and 42, fault detection units 13, 23, 33, and 43, fault evaluating units 14, 24, 34, and 44, and selection units 15, 25, 35, and 45, each of which has the same arrangement as that shown in FIG. 1.

The fault evaluating operation in the switching package A will be described below with reference to FIG. 2. In this case, the switching package A may be referred to as a switching package of its own; the switching package B, a redundant switching package; and the switching packages C and D, opposing (partner) packages. The fault detection unit 13 of the switching package A monitors input signals from the switching packages C and D to detect a fault in the switching package C or D. When the fault detection unit 13 detects a fault in the switching package C or D, the fault information insertion unit 11 generates the fault information of the switching package C or D from which the fault is detected, inserts the fault information in another free time slot of the main signal, and sends the main signal to the switching packages C and D.

In the switching package B, similarly, when the fault detection unit 23 detects a fault in the switching package C or D on the basis of input signals, the fault information insertion unit 21 inserts the fault information of the fault package C or D from which the fault is detected in another free time slot of the main signal, and sends the main signal to the switching packages C and D. In the switching packages C and D, when the fault detection units 33 and 43 detect a fault in the switching package A or B on the basis of input signals, the fault information insertion units 31 and 41 insert the fault information of the detected switching package A or B from which the fault is detected in another free time slot of the main signal, and send the main signal to the switching packages A and B.

In the switching package A, the fault information extraction unit 12 extracts the fault information of the switching package A or B, which is generated by the switching packages C and D and inserted in the free time slot of the main signal. The fault information insertion unit 11 inserts the fault information extracted by the fault information extraction unit 12 in another free time slot of the main signal, and sends the main signal to the switching packages C and D.

In the switching package B, similarly, the fault information extraction unit 22 extracts the fault information of the switching package A or B, which is inserted in the main signal by the switching packages C and D, and the fault information insertion unit 21 sends the extracted fault information to the switching packages C and D. In the switching packages C and D, the fault information extraction units 32 and 42 extract the fault information of the switching package C or D, which is inserted in the main signal by the switching packages A and B, and the fault information insertion units 31 and 41 send the extracted fault information to the switching packages A and B.

The fault information extraction unit 12 of the switching package A extracts the fault information of the switching package C or D, which is generated and inserted by the switching package B, together with the fault information of the switching package A or B, which is generated and inserted by the switching packages C and D. Therefore, the fault information extraction unit 12 of the switching package A is notified of all the fault detection states at the monitor points of the respective switching packages. The fault evaluating unit 14 of the switching package A performs fault evaluating in accordance with the fault evaluating logic based on the combination of the pieces of fault information of the switching packages, which are notified from the switching packages B, C, and D.

More specifically, in the switching package A, the fault information extraction unit 12 extracts the fault information of the switching package C or D, which is generated by the switching package B, together with the fault information of the switching package A or B, which is generated by the switching packages C and D. The fault detection unit 13 detects abnormalities in the main signals received from the switching packages C and D. On the basis of the pieces of fault information of the switching packages B, C, and D, which are output from the fault information extraction unit 12, and a fault detection signal output from the fault detection unit 13, the fault evaluating unit 14 determines a fault in the switching package A when one of the following conditions I to III is satisfied:

I. abnormalities are detected from both main signals input from the switching packages C and D, II. an abnormality is detected from the main signal input from the switching package C or D, and the fault information (generated by the switching package B) of the switching package from which an abnormality is detected is not extracted, and III. the fault information (generated by the switching package C or D) of the switching package A is extracted from the signals sent from the switching packages C and D.

The fault evaluating unit 14 recognizes the fault of the switching package B, C, or D in accordance with the fault information of the switching packages C and D, which is generated by the switching package B, and the fault information of the switching package B, which is generated by the switching packages C and D. In addition, the fault evaluating unit 14 outputs the fault evaluating result to the selection unit 15. The selection unit 15 selects a normal one of, e.g., the opposing packages C and D on the basis of the fault evaluating result from the fault evaluating unit 14.

In the switching packages B, C, and D as well, the fault evaluating units 24, 34, and 44 are notified of the fault detection states of all the switching packages, so that the respective switching packages can individually perform fault evaluation. The selection units 25, 35, and 45 respectively select a normal one of the opposing packages on the basis of the fault evaluating results from the fault evaluating units 24, 34, and 44.

As has been described above, according to the fault evaluating system of the present invention, the switching packages which are duplexed and bridged to oppose each other need not have a dedicated alarm processing unit, so that connection between the switching packages can be minimized. A switching package having a duplex structure can recognize the fault states of other switching packages and can also recognize the fault state of its own switching package. In addition, since fault evaluation can be realized by a logic circuit as hardware, fault evaluation can be quickly performed. As a result, redundant system switching in fault detection can be quickly performed, and early main signal relief processing is enabled.

What is claimed is:

1. A fault evaluating system for a transmission apparatus having four packages which are mutually duplexed in both transmission and reception directions and bridged to oppose each other, wherein each of said four packages comprises:

fault detection means for individually detecting an abnormality in signals transmitted from a pair of duplexed opposing packages;

fault information extraction means for individually extracting fault information representing a faulty package, which is contained in the signals transmitted from said pair of duplexed opposing packages;

fault information insertion means for generating fault information representing the faulty package in accordance with a detection output from said fault detection means, inserting the fault information and the fault information extracted by said fault information extraction means in a transmit signal, and sending back the transmit signal to said pair of duplexed opposing packages;

individual fault evaluating means for determining which of said four packages is the faulty package on the basis of a detection output from said fault detection means and the fault information extracted by said fault information extraction means; and individual switching means for switching between said pair of duplexed opposing packages on the basis of an evaluating result from said individual fault evaluating means, whereby said individual switching means selects said signals transmitted from a non-faulty package.

2. A fault evaluating system according to claim 1, wherein the signals are transmitted and received between said four packages and wherein said signals are time-divisionally transmitted using a plurality of time slots, and wherein said fault information insertion means inserts the fault information in a free time slot of the transmit signal to be transmitted.

3. A fault evaluating system according to claim 2, wherein said fault information insertion means inserts the fault information in the free time slot which is different from a first time slot from which the abnormality is detected and a second time slot from which the fault information is extracted.

4. A fault evaluating system according to claim 1, wherein said individual fault evaluating means determines that a same package, which contains said fault evaluating means, is faulty, when one of the following conditions is satisfied:

I. said abnormality is detected in said signals transmitted from both of said pair of duplexed opposing packages, II. said abnormality is detected in one of the signals transmitted from one of said pair of duplexed opposing packages, and the fault information of said one of said pair of duplexed opposing packages which has transmitted the signal in which the abnormality is detected is not extracted, and III. when fault information of said same package is extracted from the signals sent from said pair of duplexed opposing packages.

5. A fault evaluating system for a transmission apparatus which has at least four packages which are mutually duplexed in both transmission and reception directions and bridged to oppose each other, and time-divisionally transmits a main signal by using a plurality of time slots, wherein each of said at least four packages comprises:
      fault detection means for individually detecting an abnormality in input main signals transmitted from at least two duplexed opposing packages;
      fault information extraction means for individually extracting sent fault information representing a faulty package, which is contained in the input main signals transmitted from said at least two duplexed opposing packages;
      fault information insertion means for generating new fault information representing the faulty package in accordance with a detection output from said fault detection means, inserting the new fault information and the sent fault information extracted by said fault information extraction means in a free time slot of the main signal, and sending back the main signal to said at least two duplexed opposing packages;
      individual fault evaluating means for specifying the fault package on the basis of the detection output from said fault detection means and the sent fault information from said fault information extraction means; and
      individual switching means for switching a reception system, on the basis of an evaluating result from said fault evaluating means, from one of said at least two duplexed opposing packages, from which a fault is detected, to another of said at least two duplexed opposing packages, from which no fault is detected.

6. A fault evaluating system for a transmission apparatus which has four switch units which are mutually duplexed in both transmission and reception directions and bridged to oppose each other, wherein said transmission apparatus time-divisionally transmits a main signal by using a plurality of time slots, and wherein each of said four switch units comprises:
   a fault detector for detecting an abnormality in input signals transmitted from a pair of duplexed opposing switch units;
   a fault data extractor for extracting a fault message representing a faulty switch unit, wherein said fault data extractor extracts said fault message from said input signals transmitted from said pair of duplexed opposing switch units;
   a fault evaluator for determining which of said four switch units is faulty, based on a detection output from said fault detector and said fault message extracted by said fault data extractor;
   a fault message insertion unit for generating said fault message corresponding to a faulty one of said pair of duplexed opposing switch units, wherein said fault message insertion unit inserts said fault message into said main signal and sends the main signal back to said pair of duplexed opposing switch units; and
   a signal routing switch connected to each of said pair of duplexed opposing switch units for selecting, from said pair of duplexed opposing switch units, a non-faulty switch unit from which no fault is detected, whereby said main signal is routed on a fault-free signal path.

* * * * *